United States Patent
Zhou et al.

(10) Patent No.: US 12,432,666 B2
(45) Date of Patent: Sep. 30, 2025

(54) POWER PRIORITIZATION INCLUDING CANDIDATE CELLS

(71) Applicant: QUALCOMM Incorporated, San Diego, CA (US)

(72) Inventors: Yan Zhou, San Diego, CA (US); Fang Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/678,877

(22) Filed: May 30, 2024

(65) Prior Publication Data

US 2024/0334345 A1    Oct. 3, 2024

Related U.S. Application Data

(63) Continuation of application No. PCT/CN2023/085337, filed on Mar. 31, 2023.

(51) Int. Cl.
*H04W 52/28*    (2009.01)
*H04W 52/30*    (2009.01)

(52) U.S. Cl.
CPC ......... *H04W 52/281* (2013.01); *H04W 52/30* (2013.01)

(58) Field of Classification Search
CPC ............................ H04W 52/281; H04W 52/30
See application file for complete search history.

(56) References Cited

U.S. PATENT DOCUMENTS

| | | | | |
|---|---|---|---|---|
| 10,992,396 B1 * | 4/2021 | Nahata | ................. | H04B 17/104 |
| 11,863,373 B2 * | 1/2024 | Tsai | .................... | H04L 41/0668 |
| 12,035,392 B2 * | 7/2024 | Virtej | ..................... | H04W 76/16 |
| 2002/0155854 A1 * | 10/2002 | Vanghi | ................ | H04W 52/143 |
| | | | | 455/442 |
| 2005/0245278 A1 * | 11/2005 | Vannithamby | ........ | H04W 52/40 |
| | | | | 455/522 |
| 2006/0234755 A1 * | 10/2006 | Jonsson | ................ | H04W 48/20 |
| | | | | 455/525 |
| 2015/0201388 A1 * | 7/2015 | Cheng | ................... | H04W 52/14 |
| | | | | 370/329 |
| 2018/0310257 A1 * | 10/2018 | Papasakellariou | .... | H04W 72/23 |
| 2019/0261281 A1 * | 8/2019 | Jung | ................. | H04W 72/0473 |
| 2019/0261291 A1 * | 8/2019 | Liu | ........................ | H04W 72/56 |
| 2019/0313348 A1 * | 10/2019 | MolavianJazi | ..... | H04W 52/281 |
| 2020/0045569 A1 * | 2/2020 | Seo | ........................ | H04W 72/23 |
| 2020/0053801 A1 * | 2/2020 | Hosseini | ............ | H04W 52/281 |

(Continued)

FOREIGN PATENT DOCUMENTS

| WO | 2022084376 A1 | 4/2022 |
|---|---|---|
| WO | 2023014447 | 2/2023 |

OTHER PUBLICATIONS

International Search Report and Written Opinion—PCT/CN2023/085337—ISA/EPO—Nov. 24, 2023.

*Primary Examiner* — Dominic E Rego
(74) *Attorney, Agent, or Firm* — Patterson+ Sheridan, L.L.P.

(57) ABSTRACT

Certain aspects of the present disclosure provide techniques for power prioritization including physical random access channel (PRACH) on candidate cells. An example method, performed at a user equipment (UE), includes allocating transmit power for a transmission of a signal to a candidate cell based on a power prioritization rule that considers UE transmit power for transmissions on the candidate cell and at least one other cell, and transmitting the signal to the candidate cell according to the allocation.

24 Claims, 11 Drawing Sheets

(56) References Cited

U.S. PATENT DOCUMENTS

| | | | |
|---|---|---|---|
| 2020/0221399 A1 | 7/2020 | Hosseini et al. | |
| 2020/0413352 A1 | 12/2020 | Takeda et al. | |
| 2020/0413444 A1* | 12/2020 | Shi | H04W 74/0833 |
| 2021/0368544 A1* | 11/2021 | Liu | H04L 5/0053 |
| 2022/0086772 A1 | 3/2022 | Cozzo et al. | |
| 2022/0159757 A1* | 5/2022 | Balasubramanian | H04L 5/0055 |
| 2022/0210743 A1* | 6/2022 | Yi | H04W 52/34 |
| 2022/0417869 A1* | 12/2022 | Ohara | H04W 52/36 |
| 2023/0035400 A1* | 2/2023 | Haghani | H04W 52/146 |
| 2023/0042073 A1* | 2/2023 | Ibrahim | H04W 52/24 |
| 2023/0156611 A1* | 5/2023 | Tang | H04W 52/367 370/318 |
| 2023/0164702 A1 | 5/2023 | Lee et al. | |
| 2023/0180147 A1* | 6/2023 | Kowalski | H04W 52/46 455/522 |
| 2023/0209530 A1* | 6/2023 | Rastegardoost | H04L 1/1854 370/329 |
| 2023/0254854 A1* | 8/2023 | Cirik | H04W 72/23 370/336 |
| 2023/0300815 A1* | 9/2023 | Li | H04L 1/1854 |
| 2023/0345339 A1* | 10/2023 | Jung | H04W 36/08 |
| 2024/0048319 A1* | 2/2024 | Yang | H04L 5/0053 |
| 2024/0114405 A1* | 4/2024 | Cheng | H04W 56/0045 |
| 2024/0121727 A1* | 4/2024 | Zhou | H04L 5/001 |
| 2024/0235798 A1* | 7/2024 | Ryu | H04W 72/23 |
| 2024/0237082 A1* | 7/2024 | Lim | H04W 74/0833 |
| 2024/0430900 A1* | 12/2024 | El Hamss | H04L 1/1812 |

\* cited by examiner

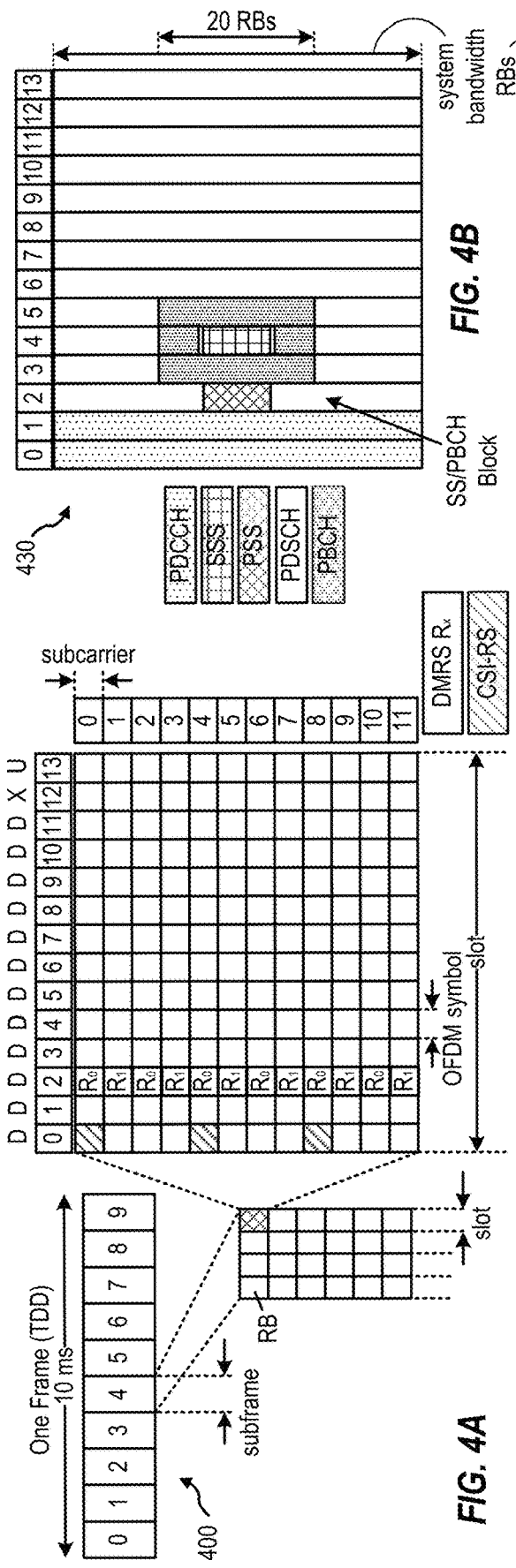
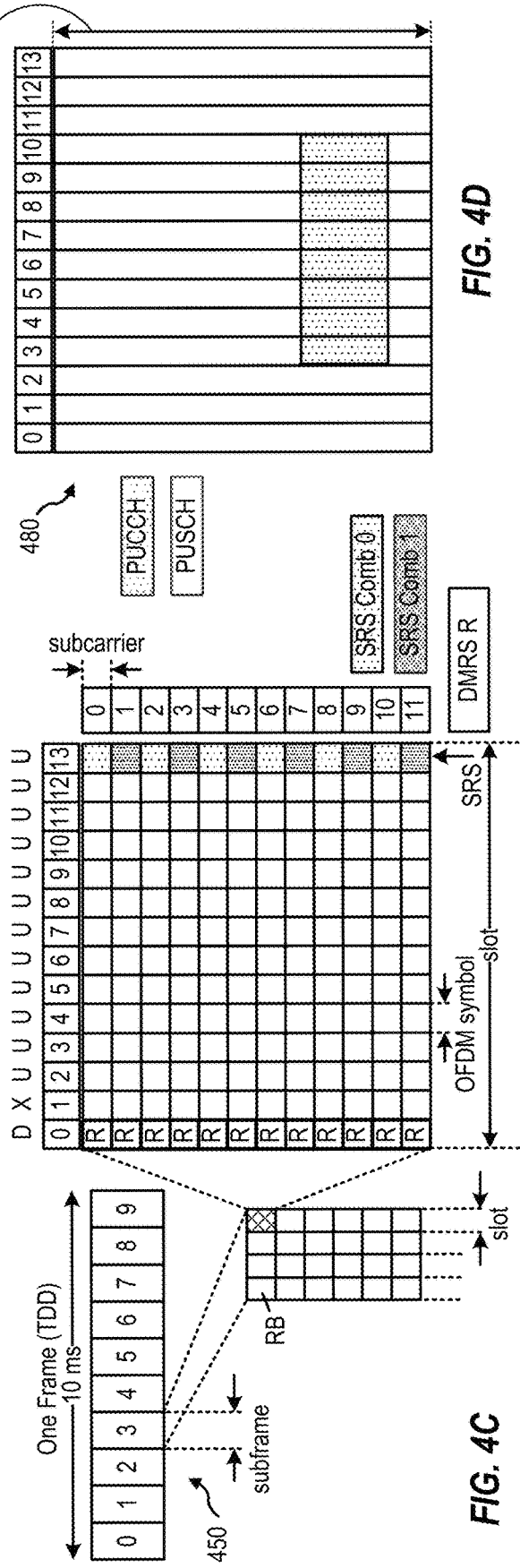

POWER PRIORITIZATION INCLUDING CANDIDATE CELLS

CROSS-REFERENCE TO RELATED APPLICATION

This continuation application claims the benefit of and priority to International Application No. PCT/CN2023/085337, filed Mar. 31, 2023, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for power prioritization when transmitting multiple channels.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication at a user equipment (UE). The method includes allocating transmit power for a transmission of a signal to a candidate cell based on a power prioritization rule that considers UE transmit power for transmissions on the candidate cell and at least one other cell; and transmitting the signal to the candidate cell according to the allocation.

Another aspect provides a method of wireless communication at a network entity. The method includes outputting, for transmission, signaling configuring a UE with information regarding a power prioritization rule that considers UE transmit power for transmissions on a candidate cell and at least one other cell; and processing at least one signal transmitted from the UE in accordance with the power prioritization rule.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
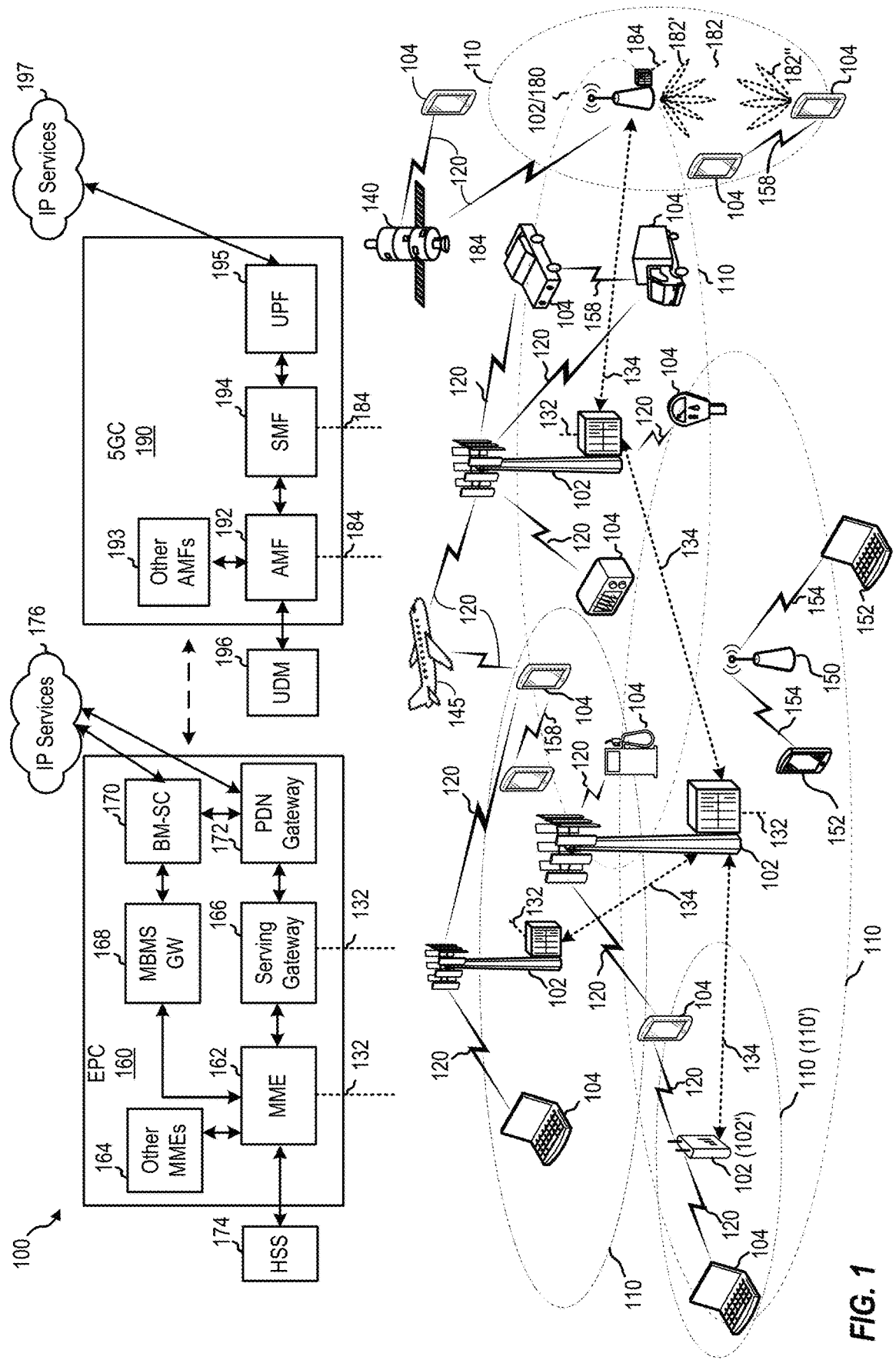
FIG. 1 depicts an example wireless communications network.

Aspects of the present disclosure provide apparatuses, methods, processing systems, and computer-readable mediums for power prioritization when transmitting multiple channels. For example, the techniques proposed herein may be used to determine how to allocate transmit power when transmitting a physical random access channel (PRACH) on candidate cells.

In advanced wireless systems, mobility procedures are in place to help maintain network connections for a user equipment (UE) as it moves between the coverage areas of different cells. Mobility procedures generally refer to mechanisms that allow a UE to transition from being served by a source cell to being served by a target cell.

In some cases, for physical layer (PHY or Layer 1/L1) and/or medium access control layer (MAC or Layer 2/L2), also referred to as L1/L2 triggered mobility (LTM), as a UE moves, a new serving cell (e.g. a primary cell (Pcell)) may be selected (e.g., reselected) among a set of pre-configured candidate cells based on L1 measurement for those cells. To save timing advance (TA) acquisition time, a UE may send a PRACH to a target candidate cell for TA measurement before it is selected as a new serving cell.

In some cases, a power prioritization rule may be used when a UE has multiple types of signals to transmit. For example, such a rule may be used to allocate transmit power when the UE transmits uplink signaling, like physical uplink shared channel (PUSCH), physical uplink control channel (PUCCH), PRACH, and/or sounding reference signal (SRS) transmissions. For example, for single cell operation (e.g., with two uplink carriers or with carrier aggregation (CA)), a total UE transmit power for uplink transmissions on serving cells in a frequency range and in a respective transmission occasion may exceed a maximum power threshold value. In such cases, the UE may allocate power to the various uplink transmissions according to a power prioritization rule (e.g., which may be configured via radio resource control (RRC) signaling) such that the total UE transmit power for transmissions on serving cells is smaller than or equal to the maximum power threshold value (e.g., in the frequency range in each symbol of a respective transmission occasion).

However, certain power prioritization rules may fail to account for uplink transmissions (e.g., PRACH transmissions) in non-serving cells (e.g., candidate cells). As a result, a UE may fail to adequately/efficiently allocate transmission power to uplink transmissions to a non-serving cell.

Aspects of the present disclosure provide techniques for allocating power to uplink transmissions according to a power prioritization rule that accounts for UE transmit power for transmissions in serving cells and candidate (e.g., non-serving) cells.

For example, in some cases for LTM, a total UE transmit power for uplink transmissions on serving cells and candidate (e.g., non-serving) cells in a frequency range and in a respective transmission occasion may exceed a maximum power threshold value (e.g., $P_{CMAX}$). In such cases, according to certain aspects of the present disclosure, the UE may allocate power to the various uplink transmissions (e.g., PUSCH, PUCCH, PRACH, and/or SRS transmissions) according to a power prioritization rule (e.g., which may be configured via RRC signaling) such that the total UE transmit power for transmissions on serving cells and candidate cells is smaller than or equal to the maximum power threshold value (e.g., in the frequency range in each symbol of a respective transmission occasion).

By utilizing techniques proposed herein, power prioritization rules may account for candidate cells, allowing a UE to allocate transmission power to uplink transmissions to a non-serving cell (e.g., a PRACH to a candidate cell), improving power management, LTM efficiency, and quality of experience (QoE) of users.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (ENB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
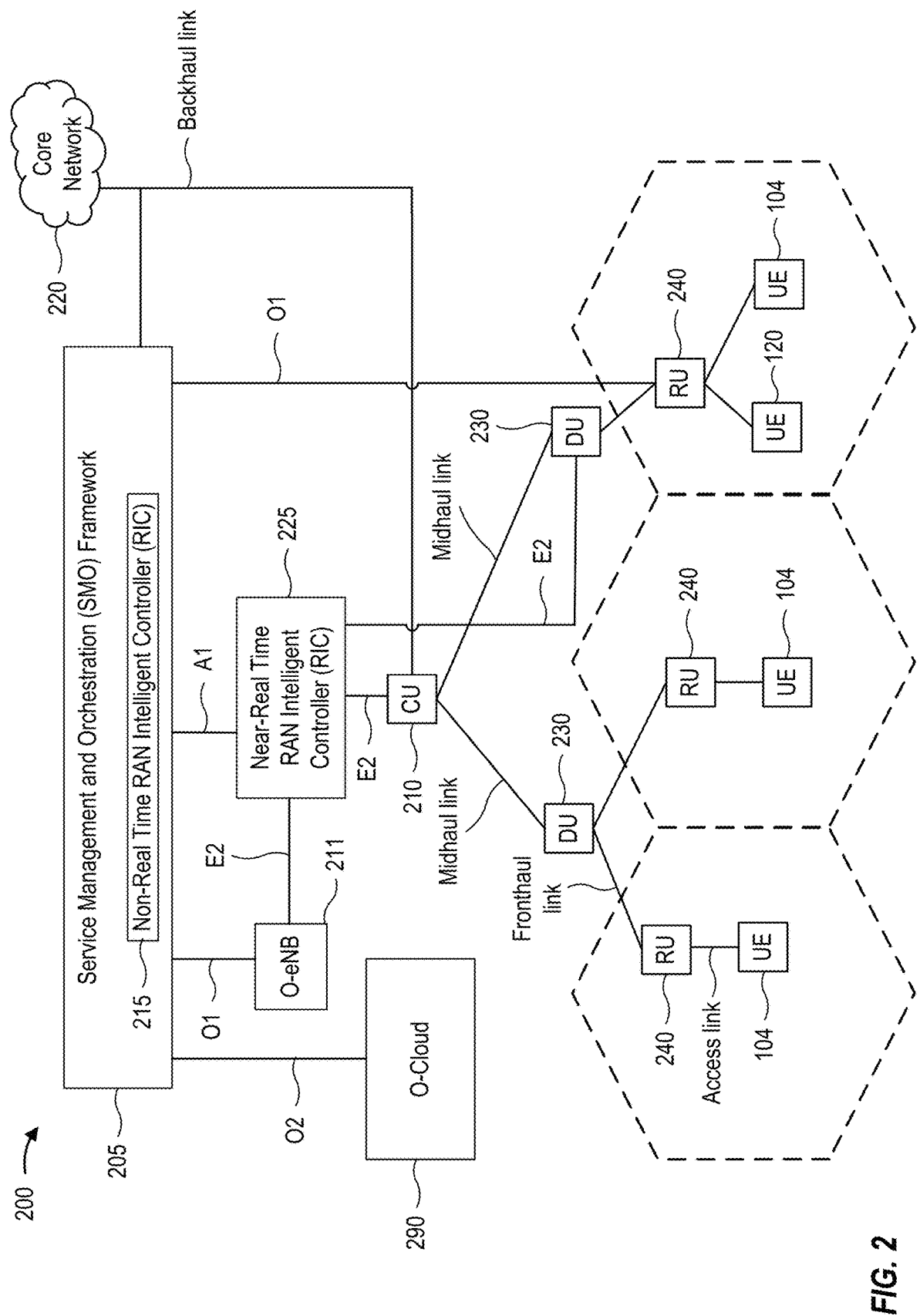
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mm Wave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-cNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
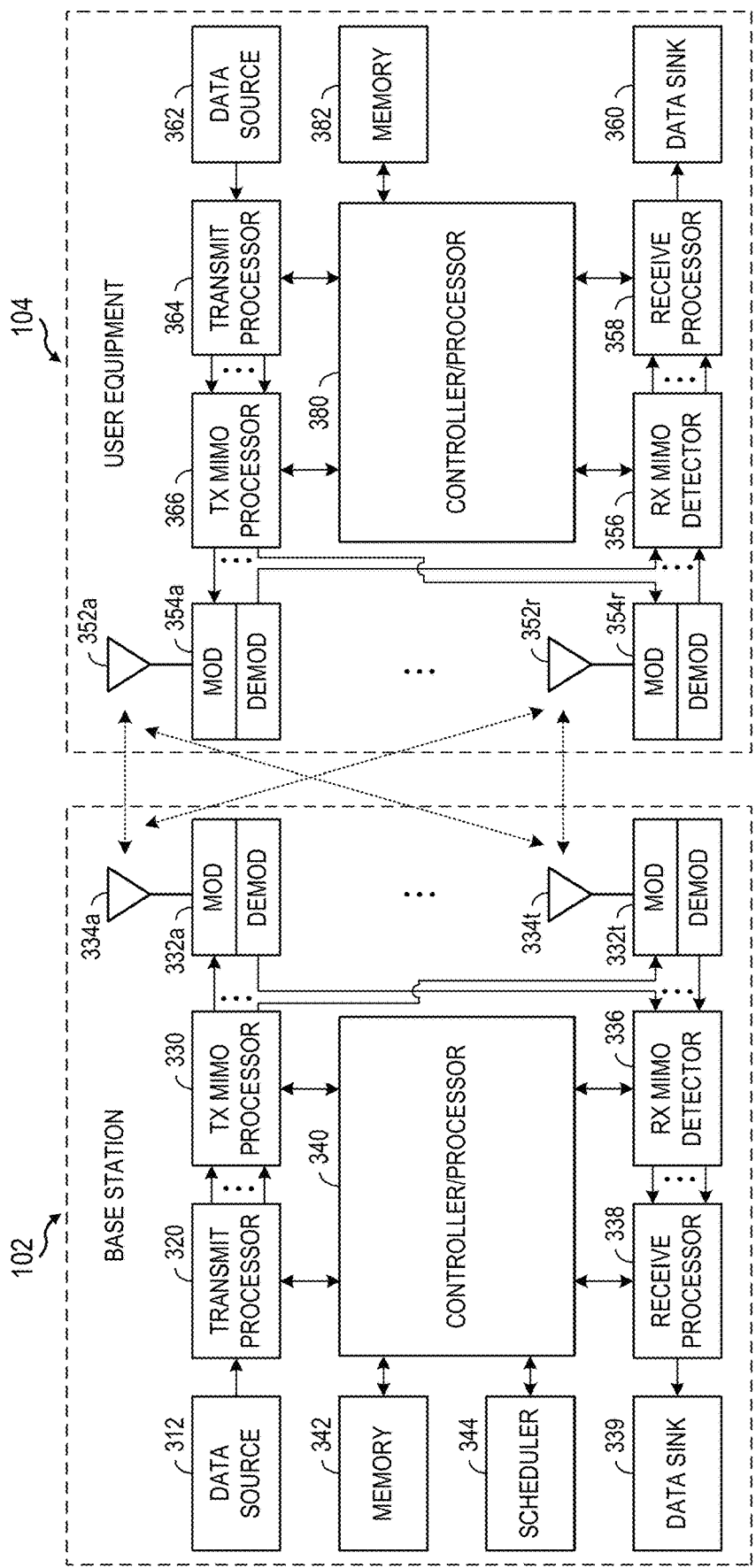
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^{\mu} \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of PRACH Triggering by DCI

PRACH triggering from a network entity may be based on higher layer signaling (e.g., RRC) or, in some cases, lower layer signaling such as a physical downlink control channel (PDCCH).

In some cases, PRACH transmissions for uplink (UL) timing in a candidate cell may be triggered via a downlink control information (DCI) from a serving cell.

Figure 5:
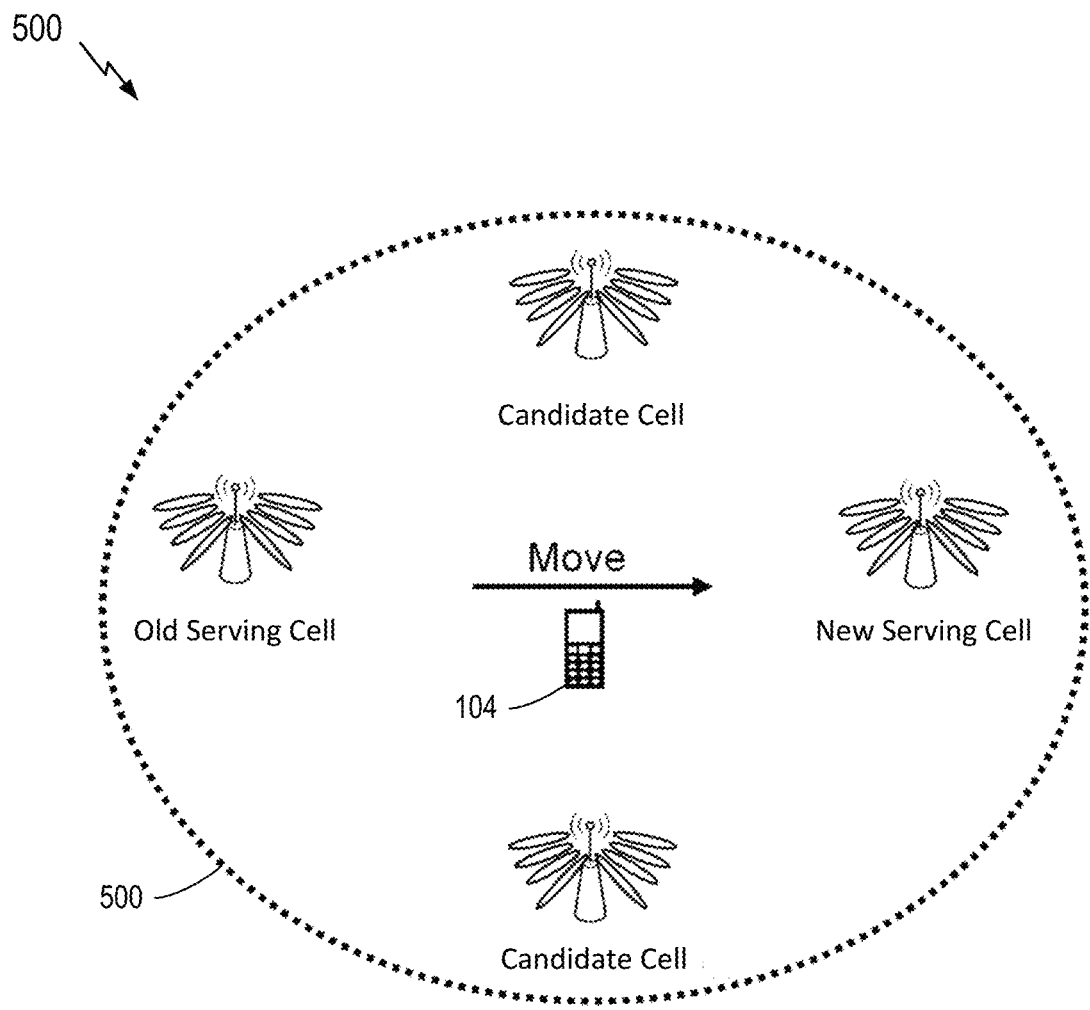
FIG. 5 depicts an example scenario with a pre-configured candidate cell set.

Triggering PRACH transmissions may be beneficial in the scenario illustrated in FIG. 5, where a UE may move between a preconfigured set 500 of candidate cells. In the illustrated example, the UE moves from a first cell (e.g., an old serving/primary cell) to a new serving candidate cell. In this case, the UE may not receive data or control information in the candidate cell, but may transmit a PRACH in order to facilitate timing adjustment for the new candidate cell before a cell change.

As will be described in greater detail below, with reference to FIG. 7, a RACH may be triggered via a PDCCH. This may be referred to as a PDCCH ordered PRACH transmission. The PDCCH order may be sent by a source cell in order to trigger a RACH transmission in a candidate cell.

The power prioritization techniques proposed herein may be used to allocate UE transmit power when transmitting PRACH in candidate cells. The techniques may, thus, help facilitate timing adjustment for a variety of different cell selection scenarios. For example, the techniques may be utilized in the candidate cell selection scenario illustrated in FIG. 5.

Overview of Dynamic Signaling-Based Mobility

As noted above, dynamic mobility signaling (e.g., L1 and/or L2-centric mobility or LTM) may lead to more efficient intra-cell and inter-cell mobility with reduced latency.

Figure 6:
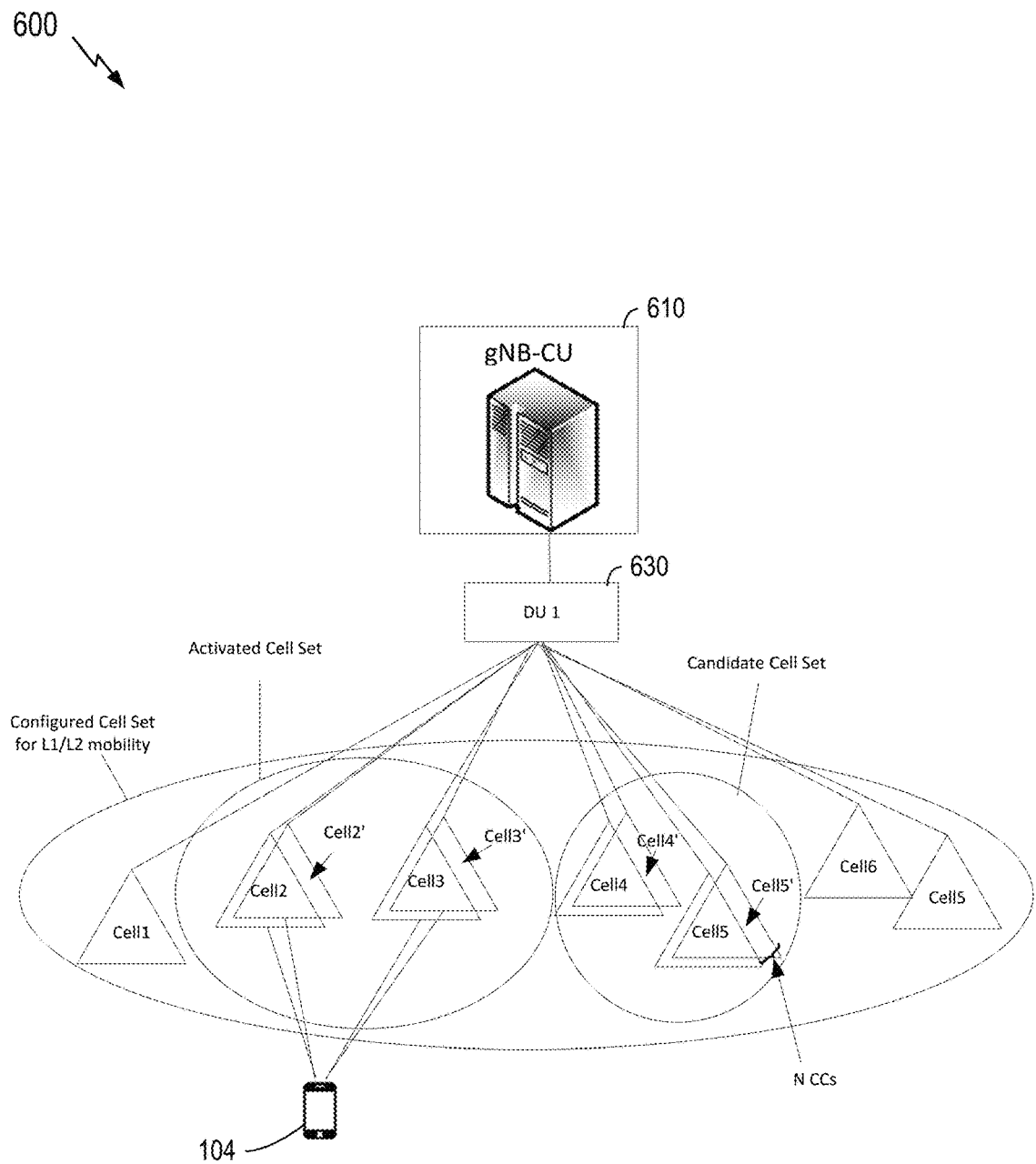
FIG. 6 depicts an example of UE mobility.

The general concept of LTM signaling may be understood with reference to the example scenario 600 shown in FIG. 6. As illustrated, the network may configure (e.g., via RRC signaling), a set of cells for L1/L2 mobility (referred to herein as an L1/L2 Mobility Configured cell set). At any given time, the network may also configure (via L1/L2 signaling) an L1/L2 Mobility Activated cell set, which refers to a group of cells in the configured set that are activated and can be readily used for data and control transfer. The network may also configure (signal) an L1/L2 Mobility Deactivated cell set, which refers to a group of cells in the configured set that are deactivated and can be readily activated by L1/L2 signaling.

L1/L2 signaling may be used for mobility management of the activated set. For example, L1/L2 signaling may be used to activate/deactivate cells in the set, select beams within the activated cells, and update/switch a primary cell (PCell). This dynamic signaling may help provide seamless mobility within the activated cells in the set. In other words, as the UE moves, the cells from the set are deactivated and activated by L1/L2 signaling. The cells to activate and deactivate may be based on various factors, such as signal quality (measurements) and loading.

As in the example illustrated in FIG. 6, in some cases, all cells in the L1/L2 Mobility Configured cell set may belong to the same DU 630 of a CU 610. This may be similar to carrier aggregation (CA), but cells may be on the same carrier frequencies. The size of the cell set configured for L1/L2 mobility signaling may vary. In general, the cell set size may be selected to be large enough to cover a meaningful mobility area.

In some cases, the UE may be provided with a subset of deactivated cells, as a candidate cell set, from which the UE could autonomously choose to add to the activated cell set. The decision of whether to add a cell from the candidate cell set to the activated cell set may be a based various factors, such as measured channel quality and loading information.

In some cases, the ability for the UE to autonomously choose to add to the activated cell set may be similar to a UE decision when configured for Conditional Handover (CHO) for fast and efficient addition of the prepared cells.

As illustrated in FIG. 6, each cell may be served by an RU. Each of the RUs may have multi-carrier (N CCs) support. In such cases, each CC may be a cell (e.g., Cell 2 and Cell 2' may be different CCs of the same RU). In such cases, activation/deactivation can be done in groups of carriers (cells).

For PCell management, L1/L2 signaling may be used to set (select) the PCell out of the preconfigured options within the activated cell set. In some cases, L3 mobility may be used for PCell change (L3 handover) when a new PCell is not from the activated cell set for L1/L2 mobility. In such cases, RRC signaling may update the set of cells for L1/L2 mobility at L3 handover.

In some cases, physical layer (Layer 1 or L1) measurement may be enhanced for L1/L2 mobility, where a serving cell can be changed via L1/L2 signalling based on L1 measurement, and both synchronous and asynchronous source and target cells may be considered.

Various mechanisms and procedures of L1/L2 based inter-cell mobility may be specified for mobility latency reduction. These may include configuration and maintenance for multiple candidate cells to allow fast application of configurations for candidate cells. Dynamic switching mechanisms among candidate serving cells (including SpCell and SCell) may be supported for the potential applicable scenarios based on L1/L2 signaling.

L1 enhancements for inter-cell beam management may include L1 measurement and reporting, as well as beam indication. Timing Advance (TA) management and CU-DU interface signaling may also be provided to support L1/L2 mobility.

L1/L2 based inter-cell mobility procedures may be applicable to a variety of scenarios. These scenarios may include standalone, CA, and new radio-dual connectivity (NR-DC) cases with serving cell change within one cell group (CG), intra-distributed unit (DU) cases, and intra-central unit (CU) inter-DU cases, intra-frequency and inter-frequency scenarios, both FR1 and FR2 scenarios, and scenarios where source and target cells may be synchronized or non-synchronized.

Aspects Related to Power Prioritization Including PRACH on Candidate Cells

As noted above, a PDCCH order may be sent by a source cell in order to trigger a RACH transmission in a candidate cell. FIG. 7 depicts an example of such a PDCCH ordered RACH transmission.

As noted above, for layer 1/2 (L1/L2) triggered mobility (LTM), as a UE moves, a new serving cell may be selected (e.g., reselected) among a set of pre-configured candidate cells based on the UE's L1 measurement for those cells. To save timing advance (TA) acquisition time, a UE may send a physical random access channel (PRACH) to a target candidate cell for TA measurement before it is selected as a new serving cell.

Figure 7:
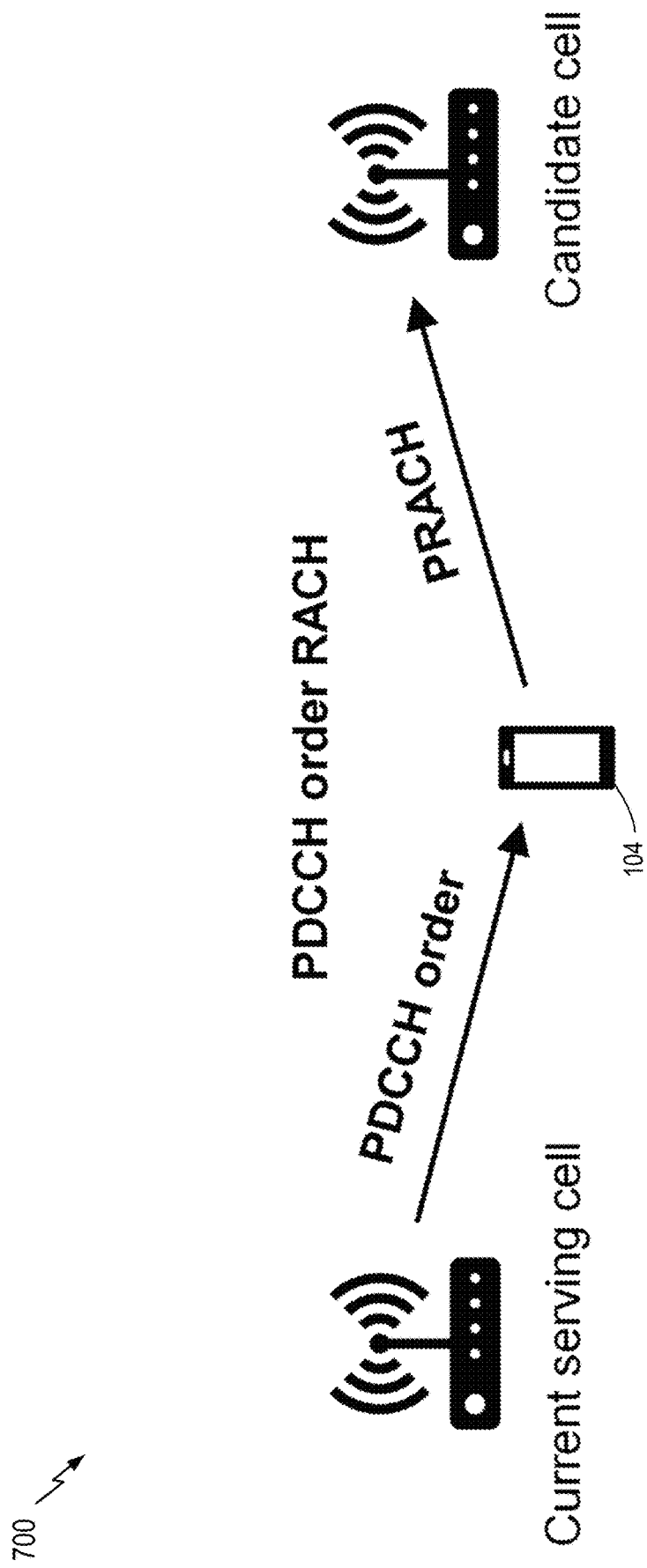
FIG. 7 depicts an example PDCCH order RACH.

As noted above, PRACH triggering from the network entity may be based on a PDCCH transmission (e.g., a PDCCH order), as illustrated in FIG. 7. For example, as shown, a current serving cell may transmit a PDCCH order to a UE. As illustrated, the PDCCH may trigger the UE to transmit a PRACH to a candidate cell before it is selected as a new serving cell (e.g., in order to save TA acquisition time).

As noted above, a power prioritization rule may be used when a UE has multiple types of signals to transmit in a given transmit opportunity (TXOP). For example, for single cell operation (e.g., with two uplink carriers or with CA), a total UE transmit power for uplink transmissions on serving cells in a frequency range and in a respective transmission occasion may exceed a maximum power threshold value. In such cases, the UE may allocate power to the various uplink transmissions according to a power prioritization rule (e.g., which may be configured via RRC signaling), such that the total UE transmit power for transmissions on serving cells is smaller than or equal to the maximum power threshold value (e.g., in the frequency range in each symbol of a respective transmission occasion).

However, certain power prioritization rules may fail to account for candidate cells (e.g., non-serving cells) for uplink transmissions (e.g., PRACH transmissions). Thus, a UE may fail to adequately/efficiently allocate transmission power to uplink transmissions to a candidate cell or non-serving cell.

Aspects of the present disclosure provide a UE transmit power prioritization rule that considers UL transmissions on both serving cells and candidate cells (e.g., non-serving cells) for LTM. For example, certain aspects provide techniques for allocating power to uplink transmissions according to a power prioritization rule that accounts for UE transmit power for transmissions on one or more cells, including at least one candidate cell.

In some aspects, for LTM, a total UE transmit power for uplink transmissions on serving cells and candidate (e.g., non-serving) cells in a frequency range and in a respective transmission occasion may exceed a maximum power threshold value (e.g., $P_{CMAX}$). In such cases, according to certain aspects of the present disclosure, the UE may allocate power to the various uplink transmissions (e.g., PUSCH, PUCCH, PRACH, and/or SRS transmissions) according to a power prioritization rule (e.g., which may be configured via RRC signaling) such that the total UE transmit power for transmissions on serving cells and candidate cells is smaller than or equal to the maximum power threshold value (e.g., in the frequency range in each symbol of a respective TXOP).

By utilizing techniques proposed herein, power prioritization rules may account for candidate cells, allowing a UE to allocate transmission power to uplink transmissions to a non-serving cell (e.g., a PRACH to a candidate cell), improving power management, LTM efficiency, and QoE of users.

Figure 8:
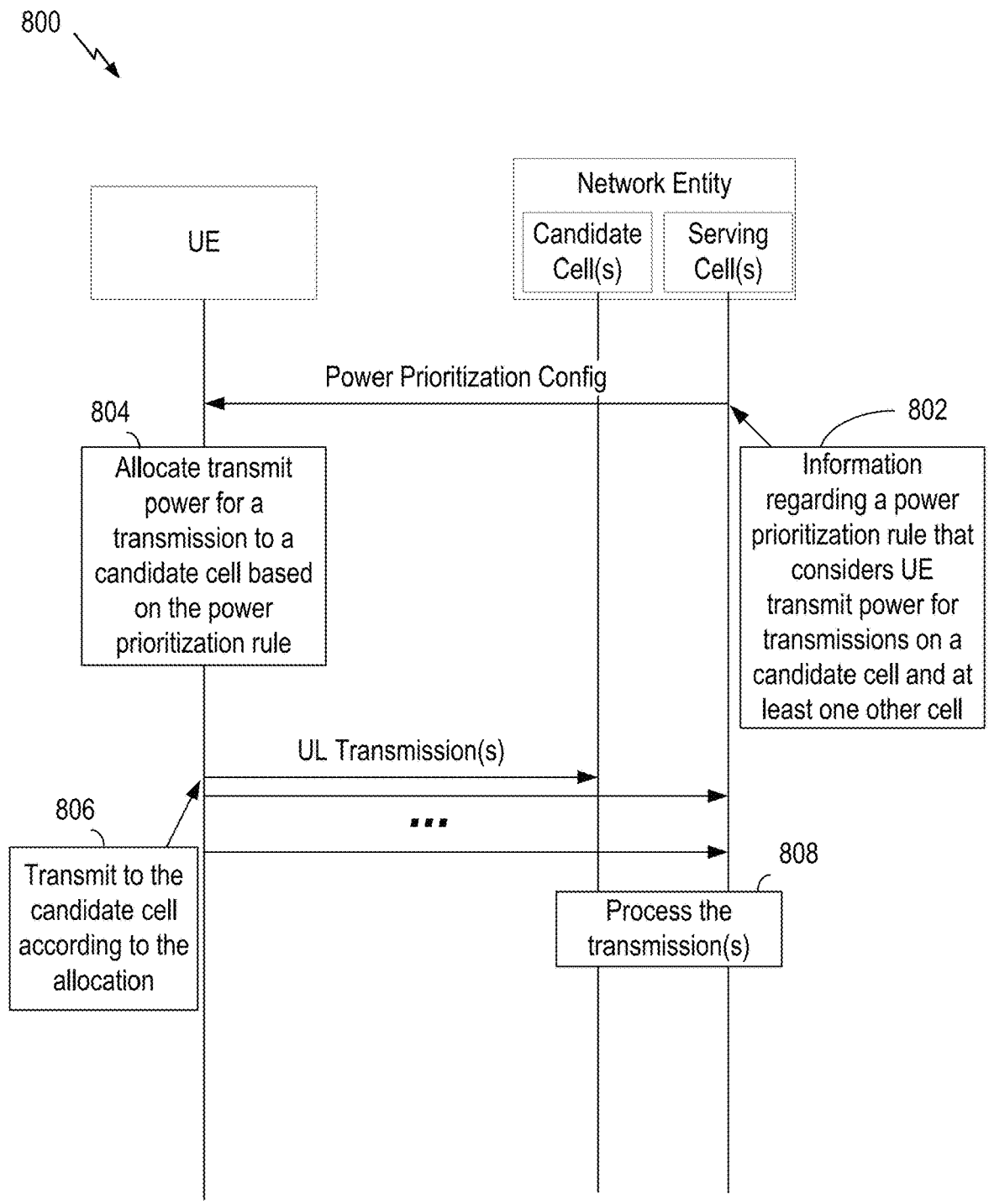
FIG. 8 depicts a call flow diagram, in accordance with certain aspects of the present disclosure.

FIG. 8 depicts a call flow diagram 800 illustrating an example of power prioritization including PRACH on candidate cells, in accordance with certain aspects of the present disclosure.

As noted above, multiple cells in an LTM (L1/L2 Mobility) configured cell set may belong to the same DU of a CU (e.g., where the DU and/or CU may be considered as network entities).

As illustrated at 802, a network entity (which may include candidate cell(s) and/or serving cell(s)) may transmit, to a UE, information regarding a power prioritization rule that considers UE transmit power for transmissions on a candidate cell and at least one other cell. This information may be provided to the UE, for example, by a serving cell, if a total UE transmit power for uplink transmissions (e.g., PUSCH, PUCCH, PRACH, and/or SRS transmissions) on serving cells and candidate cells (e.g., non-serving cells) in a frequency range and in a respective transmission occasion exceeds a maximum power threshold value (e.g., $P_{CMAX}$).

As illustrated at 804, the UE may allocate power to an uplink transmission to a candidate cell (e.g., a non-serving cell) (and may allocate power to other uplink transmissions to other cells) according to a power prioritization rule (e.g., which may be configured via radio resource control (RRC) signaling) such that the total UE transmit power for transmissions on serving cells and candidate cells (e.g., non-serving cells) is smaller than or equal to the maximum power threshold value (e.g., in each symbol of a respective transmission occasion).

As illustrated at 806, the UE may then transmit to the candidate cell (e.g., and transmit to other cells) according to the allocation. For example, in some cases, the UL transmission(s) may include a PRACH transmission to one or more candidate cells and a PUCCH transmission to a serving cell.

As illustrated at 808, the network entity (e.g., including candidate cell(s) and serving cell(s)) may process the UL transmissions from the UE.

As noted above, certain aspects provide a UE transmission power prioritization rule that considers UL transmissions on both serving cell and candidate cell for LTM.

For example, in some aspects, for single cell operation with two uplink carriers or for operation with carrier aggregation, if a total UE transmit power for uplink transmissions (e.g., PUSCH or PUCCH or PRACH or SRS transmissions) on serving cells and candidate cells for LTM in a frequency range (e.g., FR1 or FR2) in a respective transmission occasion i would exceed $\hat{P}_{CMAX}(i)$ (e.g., where $\hat{P}_{CMAX}(i)$ is the linear value of $P_{CMAX}(i)$ in transmission occasion i), the UE may allocate power to uplink transmissions according to a priority order (e.g., in descending order) so that the total UE transmit power for transmissions on serving cells and candidate cells for LTM in the frequency range is smaller than or equal to $\hat{P}_{CMAX}(i)$ for that frequency range in every symbol of transmission occasion i.

In some cases (e.g., where certain transmissions have a same priority order and/or for operation with CA), the UE may prioritize power allocation for transmissions on the primary cell (PCell) of a master cell group (MCG) and/or a secondary cell group (SCG) over transmissions on a secondary cell and/or a candidate cell for LTM.

According to certain aspects, the candidate cell (e.g., non-serving cell) may be a deactivated serving cell or a DL-only serving cell (e.g., which cannot be scheduled/configured for PUCCH/PUSCH, but may be configured for PRACH). In some aspects, the candidate cell may be a candidate cell that cannot be scheduled or configured for any of PDCCH/PDSCH/PUCCH/PUSCH and/or does not participate in downlink and/or uplink carrier aggregation (CA).

In some aspects, the candidate cell may be a candidate cell to which a UE may be ready to transmit PRACH (e.g., as indicated/activated by a network entity). In some aspects, the candidate cell may be a candidate cell having a center frequency or bandwidth that is different from any serving cell (e.g., such that transmissions on the candidate cell may need RF tuning). In some cases, the target candidate cell for LTM may be an inter-frequency cell that is not a current serving cell.

According to certain aspects, the power prioritization rule may allocate UE transmit power according to a priority order of different transmission types. The different transmission types may include periodic (e.g., configured), semi-persistent (e.g., activated), or dynamically scheduled (e.g., aperiodic) types of transmissions, including PRACH, PUCCH, PUSCH, or SRS transmissions.

In some aspects, different subtypes of a transmission type may be considered as different types. For example a PUCCH having hybrid automatic repeat request (HARQ) acknowledgement (ACK) information may be considered as a different type from a PUCCH having a scheduling request (SR) or a PUCCH having a link recovery request (LRR) or a PUCCH having channel state information (CSI). Similarly, a PUSCH having HARQ-ACK information may be considered as a different type from a PUSCH having CSI or a PUSCH having Msg3 or MsgB information in a RACH procedure (e.g., in a Type-1 or Type-2 RACH procedure).

In some aspects, different transmission types may be associated with priority index values (e.g., indicating higher, lower, or equal priority values), and the priority order may be based on the priority index values. In such aspects, priority values for each transmission type may be different for different cells. For example, a first cell may have a first priority value for PUSCH transmissions, whereas a second cell may have a second (e.g., different) priority value for PUSCH transmissions. In such cases, the first cell may be a candidate cell, and the second cell may be a serving cell, or the first cell and the second cell may both be candidate cells (or may both be serving cells).

According to certain aspects, for example, an uplink transmission on a candidate cell may have a lower, same, or higher priority than various transmissions on a serving cell or PCell. Similarly, an uplink transmission on a candidate cell may have a lower, same, or higher priority than various transmissions on a same or different candidate cell.

For example, in some aspects, a priority order (e.g., as determined by a power prioritization rule) may be defined by a list applicable to the candidate cells and/or the serving cells. The following is an illustrative, non-exhaustive list to illustrate how an example priority order may be defined, in descending order of priority:

1. A PRACH transmission on a PCell, serving cell, or candidate cell;
2. A PUCCH or PUSCH transmission having a larger priority index (e.g., than a different PUCCH or PUSCH transmission);
3. A PUCCH or PUSCH transmission including HARQ-ACK information, SR, and/or LRR;
4. A PUCCH or PUSCH transmission including CSI;
5. An SRS transmission (e.g., with aperiodic SRS having higher priority than semi-persistent and/or periodic SRS).

Using such a priority order, for example, a PRACH transmission on a candidate cell could have a higher priority than a PUCCH or PUSCH transmission including CSI. As a result, a prioritization rule implementing such an order may help ensure efficient time acquisition in a candidate cell, which may help achieve mobility with reduced latency.

According to certain aspects, the power prioritization rule (or information regarding the power prioritization rule, such as priority orders or priority index values) may be signaled to the UE by a network entity (e.g., a serving cell, source cell, and/or primary cell). Signaling details of the power prioritization rule in this manner may increase flexibility and allow adaptation to achieve different objectives and/or adaptation to different conditions or scenarios.

Example Operations

Figure 9:
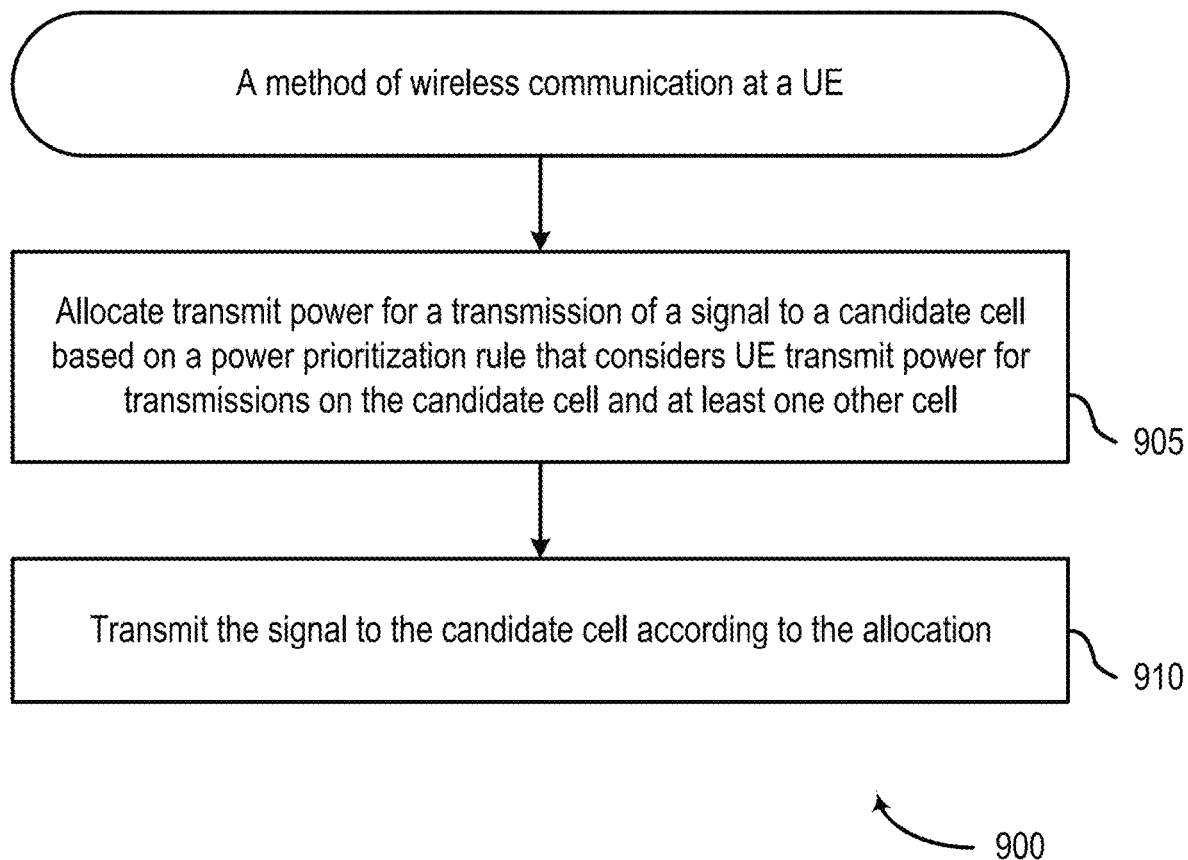
FIG. 9 depicts a method for wireless communications.

FIG. 9 shows an example of a method 900 of wireless communication at a UE, such as a UE 104 of FIGS. 1 and 3.

Method 900 begins at step 905 with allocating transmit power for a transmission of a signal to a candidate cell based on a power prioritization rule that considers UE transmit power for transmissions on the candidate cell and at least one other cell. In some cases, the operations of this step refer to, or may be performed by, circuitry for allocating and/or code for allocating as described with reference to FIG. 11.

Method 900 then proceeds to step 910 with transmitting the signal to the candidate cell according to the allocation. In some cases, the operations of this step refer to, or may be performed by, circuitry for transmitting and/or code for transmitting as described with reference to FIG. 11.

In some aspects, the candidate cell belongs to a set of candidate cells that support mobility signaling via PHY layer or MAC layer signaling.

In some aspects, the signal comprises a PRACH.

In some aspects, the at least one other cell comprises at least one serving cell.

In some aspects, the candidate cell comprises at least one of: a deactivated serving cell; or a DL-only serving cell.

In some aspects, the power prioritization rule is designed to limit total UE transmit power in a given transmission occasion based on a threshold value.

In some aspects, the threshold value is signaled via at least one of RRC signaling or dynamic signaling.

In some aspects, the prioritization rule allocates UE transmit power according to a priority order of different transmission types.

In some aspects, the different transmission types comprise at least one of periodic, semi-persistent, or dynamically scheduled types of transmissions.

In some aspects, the different transmission types comprise two or more of: a PRACH transmission; a PUCCH transmission; a PUSCH transmission; and an SRS transmission.

In some aspects, the different transmission types are associated with priority index values; and the priority order is based on the priority index values.

In some aspects, at least one of the different transmission types is associated with: a first priority index value in the candidate cell; and a second priority index value in the at least one other cell.

In some aspects, the method 900 further includes receiving signaling configuring the UE with information regarding the power prioritization rule. In some cases, the operations of this step refer to, or may be performed by, circuitry for receiving and/or code for receiving as described with reference to FIG. 11.

Figure 11:
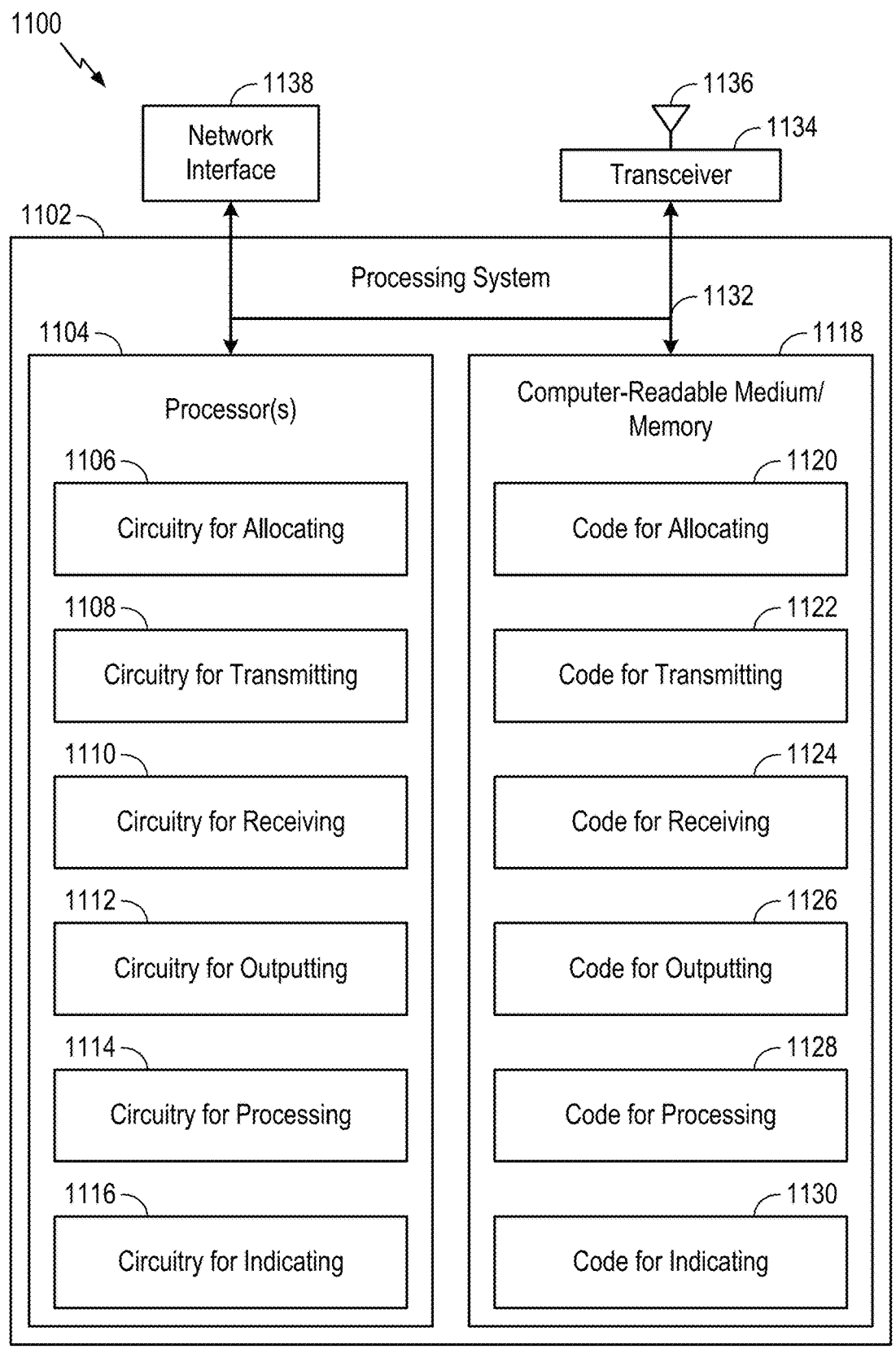
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
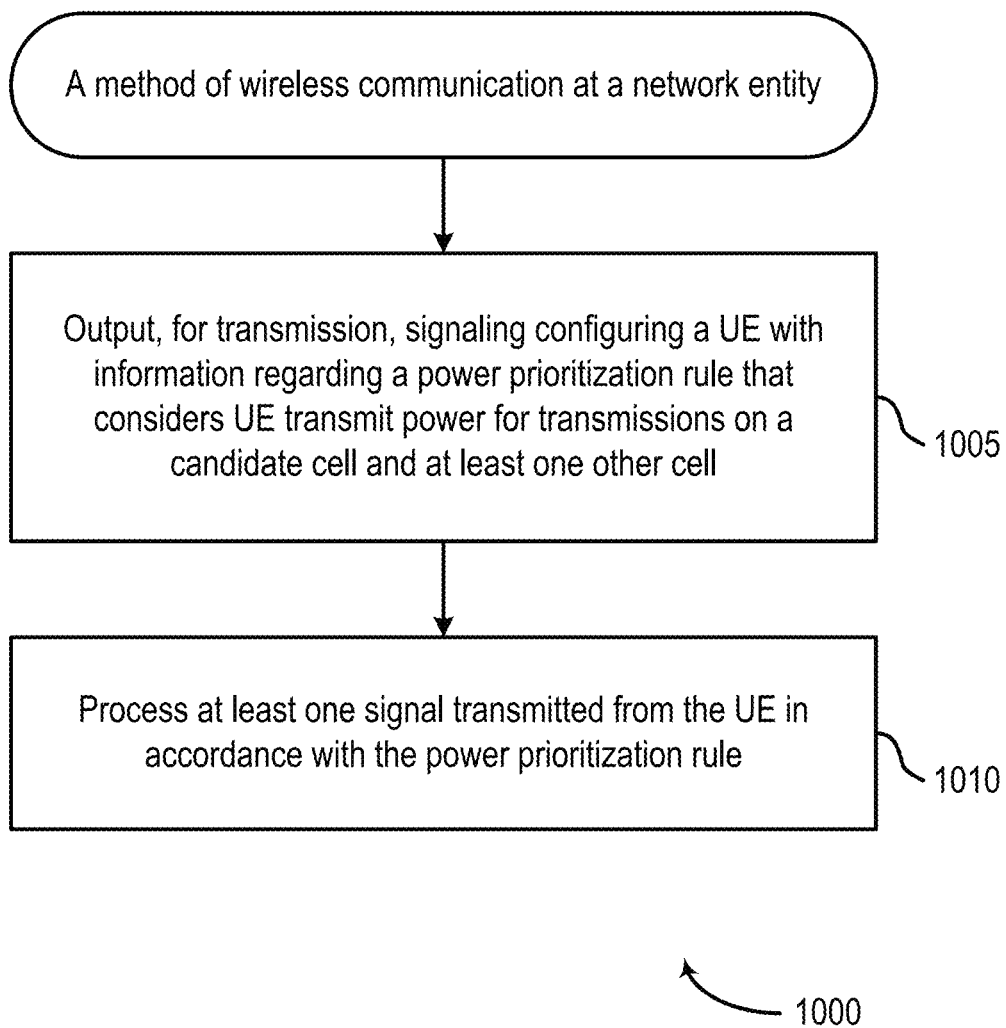
FIG. 10 depicts a method for wireless communications.

FIG. 10 shows an example of a method 1000 of wireless communication at a network entity, such as a BS 102 of FIGS. 1 and 3, or a disaggregated base station as discussed with respect to FIG. 2.

Method 1000 begins at step 1005 with outputting, for transmission, signaling configuring a UE with information regarding a power prioritization rule that considers UE transmit power for transmissions on a candidate cell and at least one other cell. In some cases, the operations of this step refer to, or may be performed by, circuitry for outputting and/or code for outputting as described with reference to FIG. 11.

Method 1000 then proceeds to step 1010 with processing at least one signal transmitted from the UE in accordance with the power prioritization rule. In some cases, the operations of this step refer to, or may be performed by, circuitry for processing and/or code for processing as described with reference to FIG. 11.

In some aspects, the candidate cell belongs to a set of candidate cells that support mobility signaling via PHY layer or MAC layer signaling.

In some aspects, the at least one signal comprises at least one of: a PRACH transmission; a PUCCH transmission; a PUSCH transmission; or an SRS transmission.

In some aspects, the at least one other cell comprises at least one serving cell.

In some aspects, the candidate cell comprises at least one of: a deactivated serving cell; or a DL-only serving cell.

In some aspects, the power prioritization rule is designed to limit total UE transmit power in a given transmission occasion based on a threshold value.

In some aspects, the method 1000 further includes indicating the threshold value to the UE via at least one of RRC signaling or dynamic signaling. In some cases, the operations of this step refer to, or may be performed by, circuitry for indicating and/or code for indicating as described with reference to FIG. 11.

In some aspects, the prioritization rule allocates UE transmit power according to a priority order of different transmission types.

In some aspects, the different transmission types comprise at least one of periodic, semi-persistent, or dynamically scheduled types of transmissions.

In some aspects, the different transmission types comprise two or more of: a PRACH transmission; a PUCCH transmission; a PUSCH transmission; and an SRS transmission.

In some aspects, the different transmission types are associated with priority index values; and the priority order is based on the priority index values.

In some aspects, at least one of the different transmission types is associated with: a first priority index value in the candidate cell; and a second priority index value in the at least one other cell.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a user equipment, such as UE 104 described above with respect to FIGS. 1 and 3. In some aspects, communications device 1100 is a network entity, such as BS 102 of FIGS. 1 and 3, or a disaggregated base station as discussed with respect to FIG. 2.

The communications device 1100 includes a processing system 1102 coupled to the transceiver 1134 (e.g., a transmitter and/or a receiver). In some aspects (e.g., when communications device 1100 is a network entity), processing system 1102 may be coupled to a network interface 1138 that is configured to obtain and send signals for the communications device 1100 via communication link(s), such as a backhaul link, midhaul link, and/or fronthaul link as described herein, such as with respect to FIG. 2. The transceiver 1134 is configured to transmit and receive signals for the communications device 1100 via the antenna 1136, such as the various signals as described herein. The processing system 1102 may be configured to perform processing functions for the communications device 1100, including processing signals received and/or to be transmitted by the communications device 1100.

The processing system 1102 includes one or more processors 1104. In various aspects, the one or more processors 1104 may be representative of one or more of receive processor 358, transmit processor 364, TX MIMO processor 366, and/or controller/processor 380, as described with respect to FIG. 3. In various aspects, one or more processors 1104 may be representative of one or more of receive processor 338, transmit processor 320, TX MIMO processor 330, and/or controller/processor 340, as described with respect to FIG. 3. The one or more processors 1104 are coupled to a computer-readable medium/memory 1118 via a bus 1132. In certain aspects, the computer-readable medium/memory 1118 is configured to store instructions (e.g., computer-executable code) that when executed by the one or more processors 1104, cause the one or more processors 1104 to perform the method 900 described with respect to FIG. 9, or any aspect related to it; and the method 1000 described with respect to FIG. 10, or any aspect related to it. Note that reference to a processor performing a function of communications device 1100 may include one or more processors 1104 performing that function of communications device 1100.

In the depicted example, computer-readable medium/memory 1118 stores code (e.g., executable instructions), such as code for allocating 1120, code for transmitting 1122, code for receiving 1124, code for outputting 1126, code for processing 1128, and code for indicating 1130. Processing of the code for allocating 1120, code for transmitting 1122, code for receiving 1124, code for outputting 1126, code for processing 1128, and code for indicating 1130 may cause the communications device 1100 to perform the method 900 described with respect to FIG. 9, or any aspect related to it; and the method 1000 described with respect to FIG. 10, or any aspect related to it.

The one or more processors 1104 include circuitry configured to implement (e.g., execute) the code stored in the computer-readable medium/memory 1118, including circuitry for allocating 1106, circuitry for transmitting 1108, circuitry for receiving 1110, circuitry for outputting 1112, circuitry for processing 1114, and circuitry for indicating 1116. Processing with circuitry for allocating 1106, circuitry for transmitting 1108, circuitry for receiving 1110, circuitry for outputting 1112, circuitry for processing 1114, and circuitry for indicating 1116 may cause the communications device 1100 to perform the method 900 described with respect to FIG. 9, or any aspect related to it; and the method 1000 described with respect to FIG. 10, or any aspect related to it.

Various components of the communications device 1100 may provide means for performing the method 900 described with respect to FIG. 9, or any aspect related to it; and the method 1000 described with respect to FIG. 10, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1134 and the antenna 1136 of the communications device 1100 in FIG. 11. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1134 and the antenna 1136 of the communications device 1100 in FIG. 11.

Example Clauses

Implementation examples are described in the following numbered clauses:

Clause 1: A method of wireless communication at a UE, comprising: allocating transmit power for a transmission of a signal to a candidate cell based on a power prioritization rule that considers UE transmit power for transmissions on the candidate cell and at least one other cell; and transmitting the signal to the candidate cell according to the allocation.

Clause 2: The method of Clause 1, wherein the candidate cell belongs to a set of candidate cells that support mobility signaling via PHY layer or MAC layer signaling.

Clause 3: The method of any one of Clauses 1 and 2, wherein the signal comprises a PRACH.

Clause 4: The method of any one of Clauses 1-3, wherein the at least one other cell comprises at least one serving cell.

Clause 5: The method of any one of Clauses 1-4, wherein the candidate cell comprises at least one of: a deactivated serving cell; or a DL-only serving cell.

Clause 6: The method of any one of Clauses 1-5, wherein the power prioritization rule is designed to limit total UE transmit power in a given transmission occasion based on a threshold value.

Clause 7: The method of Clause 6, wherein the threshold value is signaled via at least one of RRC signaling or dynamic signaling.

Clause 8: The method of Clause 6, wherein the prioritization rule allocates UE transmit power according to a priority order of different transmission types.

Clause 9: The method of Clause 8, wherein the different transmission types comprise at least one of periodic, semi-persistent, or dynamically scheduled types of transmissions.

Clause 10: The method of Clause 8, wherein the different transmission types comprise two or more of: a PRACH transmission; a PUCCH transmission; a PUSCH transmission; and an SRS transmission.

Clause 11: The method of Clause 8, wherein: the different transmission types are associated with priority index values; and the priority order is based on the priority index values.

Clause 12: The method of Clause 11, wherein at least one of the different transmission types is associated with: a first priority index value in the candidate cell; and a second priority index value in the at least one other cell.

Clause 13: The method of any one of Clauses 1-12, further comprising receiving signaling configuring the UE with information regarding the power prioritization rule.

Clause 14: A method of wireless communication at a network entity, comprising: outputting, for transmission, signaling configuring a UE with information regarding a power prioritization rule that considers UE transmit power for transmissions on a candidate cell and at least one other cell; and processing at least one signal transmitted from the UE in accordance with the power prioritization rule.

Clause 15: The method of Clause 14, wherein the candidate cell belongs to a set of candidate cells that support mobility signaling via PHY layer or MAC layer signaling.

Clause 16: The method of any one of Clauses 14 and 15, wherein the at least one signal comprises at least one of: a PRACH transmission; a PUCCH transmission; a PUSCH transmission; or an SRS transmission.

Clause 17: The method of any one of Clauses 14-16, wherein the at least one other cell comprises at least one serving cell.

Clause 18: The method of any one of Clauses 14-17, wherein the candidate cell comprises at least one of: a deactivated serving cell; or a DL-only serving cell.

Clause 19: The method of any one of Clauses 14-18, wherein the power prioritization rule is designed to limit total UE transmit power in a given transmission occasion based on a threshold value.

Clause 20: The method of Clause 19, further comprising indicating the threshold value to the UE via at least one of RRC signaling or dynamic signaling.

Clause 21: The method of Clause 19, wherein the prioritization rule allocates UE transmit power according to a priority order of different transmission types.

Clause 22: The method of Clause 21, wherein the different transmission types comprise at least one of periodic, semi-persistent, or dynamically scheduled types of transmissions.

Clause 23: The method of Clause 21, wherein the different transmission types comprise two or more of: a PRACH transmission; a PUCCH transmission; a PUSCH transmission; and an SRS transmission.

Clause 24: The method of Clause 21, wherein: the different transmission types are associated with priority index values; and the priority order is based on the priority index values.

Clause 25: The method of Clause 24, wherein at least one of the different transmission types is associated with: a first priority index value in the candidate cell; and a second priority index value in the at least one other cell.

Clause 26: An apparatus, comprising: at least one memory comprising executable instructions; and at least one processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by at least one processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), the apparatus comprising:
   at least one memory comprising executable instructions; and
   at least one processor configured to execute the executable instructions and cause the apparatus to:
      allocate transmit power for a transmission of a signal to a candidate cell, that is a non-serving cell, based on a power prioritization rule that considers UE transmit power for transmissions on the candidate cell, a primary cell (PCell), and at least one secondary cell (Scell), wherein:
         the power prioritization rule allocates UE transmit power according to a priority order of different transmission types;
         the priority order specifies that a physical random access channel (PRACH) transmission on the candidate cell has a highest priority among the different transmission types; and
         the different transmission types includes a PRACH transmission on the PCell; and
      transmit the PRACH on the candidate cell according to the allocation.

2. The apparatus of claim 1, wherein the candidate cell belongs to a set of candidate cells that support mobility signaling via physical (PHY) layer or medium access control (MAC) layer (L1/L2) signaling.

3. The apparatus of claim 1, wherein the PCell and the at least one SCell comprise serving cells.

4. The apparatus of claim 1, wherein the candidate cell comprises at least one of:
   a cell that does not participate in carrier aggregation (CA);
   a deactivated serving cell; or
   a downlink (DL)-only serving cell.

5. The apparatus of claim 1, wherein the power prioritization rule limits total UE transmit power in a given transmission occasion to a threshold value.

6. The apparatus of claim 5, wherein the threshold value is signaled via at least one of radio resource control (RRC) signaling or dynamic signaling.

7. The apparatus of claim 1, wherein the different transmission types comprise at least one of: periodic, semi-persistent, or dynamically scheduled types of transmissions.

8. The apparatus of claim 1, wherein the different transmission types comprise two or more of:
   a physical uplink control channel (PUCCH) transmission;
   a physical uplink shared channel (PUSCH) transmission; and
   a sounding reference signal (SRS) transmission.

9. The apparatus of claim 1, wherein:
   the different transmission types are associated with priority index values; and
   the priority order is based on the priority index values.

10. The apparatus of claim 9, wherein at least one of the different transmission types is associated with:
   a first priority index value in the candidate cell; and
   a second priority index value in at least one of the PCell or the at least one SCell.

11. The apparatus of claim 1, wherein the at least one processor is further configured to execute the executable instructions and cause the apparatus to receive signaling configuring the UE with information regarding the power prioritization rule.

12. An apparatus for wireless communication at a network entity, the apparatus comprising:
- at least one memory comprising executable instructions; and
- at least one processor configured to execute the executable instructions and cause the apparatus to:
  - output, for transmission, signaling configuring a user equipment (UE) with information regarding a power prioritization rule that considers UE transmit power for transmissions on a candidate cell, that is a non-serving cell, a primary cell (PCell), and at least one secondary cell (Scell), wherein:
    - the power prioritization rule allocates UE transmit power according to a priority order of different transmission types;
    - the priority order specifies that a physical random access channel (PRACH) transmission on the candidate cell has a highest priority among the different transmission types; and
    - the different transmission types includes a PRACH transmission on the PCell; and
  - process the PRACH transmission on the candidate cell transmitted from the UE in accordance with the power prioritization rule.

13. The apparatus of claim 12, wherein the candidate cell belongs to a set of candidate cells that support mobility signaling via physical (PHY) layer or medium access control (MAC) layer (L1/L2) signaling.

14. The apparatus of claim 12, wherein the at least one signal comprises at least one of:
- a physical uplink control channel (PUCCH) transmission;
- a physical uplink shared channel (PUSCH) transmission; or
- a sounding reference signal (SRS) transmission.

15. The apparatus of claim 12, wherein the PCell and the at least one SCell comprise serving cells.

16. The apparatus of claim 12, wherein the candidate cell comprises at least one of:
- a cell that does not participate in carrier aggregation (CA);
- a deactivated serving cell; or
- a downlink (DL)-only serving cell.

17. The apparatus of claim 12, wherein the power prioritization rule limits total UE transmit power in a given transmission occasion to a threshold value.

18. The apparatus of claim 17, wherein the at least one processor is further configured to execute the executable instructions and cause the apparatus to indicate the threshold value to the UE via at least one of radio resource control (RRC) signaling or dynamic signaling.

19. The apparatus of claim 12, wherein the different transmission types comprise at least one of: periodic, semi-persistent, or dynamically scheduled types of transmissions.

20. The apparatus of claim 12, wherein the different transmission types comprise two or more of:
- a physical uplink control channel (PUCCH) transmission;
- a physical uplink shared channel (PUSCH) transmission; and
- a sounding reference signal (SRS) transmission.

21. The apparatus of claim 12, wherein:
- the different transmission types are associated with priority index values; and
- the priority order is based on the priority index values.

22. The apparatus of claim 21, wherein at least one of the different transmission types is associated with:
- a first priority index value in the candidate cell; and
- a second priority index value in at least one of the PCell or the at least one SCell.

23. A method of wireless communication at a user equipment (UE), comprising:
- allocating transmit power for a transmission of a signal to a candidate cell, that is a non-serving cell, based on a power prioritization rule that considers UE transmit power for transmissions on the candidate cell, a primary cell (PCell), and at least one secondary cell (Scell), wherein:
  - the power prioritization rule allocates UE transmit power according to a priority order of different transmission types;
  - the priority order specifies that a physical random access channel (PRACH) transmission on the candidate cell has a highest priority among the different transmission types; and
  - the different transmission types includes a PRACH transmission on the PCell; and
- transmitting the PRACH on the candidate cell according to the allocation.

24. A method of wireless communication at a network entity, comprising:
- outputting, for transmission, signaling configuring a user equipment (UE) with information regarding a power prioritization rule that considers UE transmit power for transmissions on a candidate cell, that is a non-serving cell, a primary cell (PCell), and at least one secondary cell (Scell), wherein:
  - the power prioritization rule allocates UE transmit power according to a priority order of different transmission types;
  - the priority order specifies that a physical random access channel (PRACH) transmission on the candidate cell has a highest priority among the different transmission types; and
  - the different transmission types includes a PRACH transmission on the PCell; and
- processing at least one signal transmitted from the UE in accordance with the power prioritization rule.

* * * * *